United States Patent [19]

Nudelman et al.

[11] 4,404,032

[45] Sep. 13, 1983

[54] PROCESS FOR PRODUCING CEMENT CLINKER

[75] Inventors: Boris I. Nudelman; Mikhail G. Chepkalenko; Alevtina A. Gasanova; Guzal A. Galimova; Roza Khaichkis; Ravkhat E. Uraev, all of Tashkent; Turgun K. Tashpulatov, Navoi; Erkin M. Butaev, Tashkent; Fedor Y. Adam, Navoi; Arnold A. Kevvai, Tashkent; Rashida G. Bodyagina, Tashkent; Sunnat I. Ibragimov, Tashkent; Alexandr P. Fedorov, Akhan-Garan, all of U.S.S.R.

[73] Assignee: Tashkentsky Nauchnoissledovatelsky I Proektny Institut Stroitelnykh Materialov, U.S.S.R.

[21] Appl. No.: 360,906

[22] Filed: Mar. 23, 1982

[51] Int. Cl.³ .............................................. C04B 7/44
[52] U.S. Cl. .................................. 106/100; 106/103
[58] Field of Search ................................ 106/100, 103

[56] References Cited

U.S. PATENT DOCUMENTS 4,105,460  8/1978  Gottlieb ............................ 106/100
4,115,137  9/1978  Nudelman et al. ................. 106/100

Primary Examiner—James Poer
Attorney, Agent, or Firm—Robert E. Burns; Emmanuel J. Lobato; Bruce L. Adams

[57] ABSTRACT

A process for producing cement clinker according to the invention comprises dry grinding of raw components, mixing the resultant raw meal with a solid fuel, pelletizing the resultant batch with the addition of calcium chloride thereto, subsequently heat treatment of the resultant pellets of a raw mix in their dense layer in zones of drying, roasting by burning a fuel over the surface of the layer with drawing fuel combustion products therethrough and removal of exhaust gases released therefrom, and cooling the resultant clinker. According to the invention, the temperature of fuel combustion products over the surface of the dense pellet layer is maintained at 1150°–1250° C. within a portion of the roasting zone extending over a length of maximum one half of the roasting zone length, with subsequent lowering of this temperature to between 900° and 1000° C. in the direction toward the cooling zone

10 Claims, No Drawings

PROCESS FOR PRODUCING CEMENT CLINKER

FIELD OF THE ART

The invention relates to the manufacture of construction materials, and more particularly, to a process for producing cement clinker.

BACKGROUND OF THE INVENTION

Various processes for producing cement clinker are known in the art. These processes generally reside in obtaining a clinker with predetermined properties by reacting calcium carbonate with alumina and silicon dioxide at 1350°–1500° C., with subsequent cooling of the resultant clinker.

Cement clinker is mainly produced by two methods: wet and dry, the difference between the methods residing in the preparation of a raw mix. In case clinker is produced by the wet method, a raw slurry is prepared, with subsequent roasting thereof in rotary kilns. With the dry method, a dry grinding of raw components is effected to prepare a raw meal which is subjected to a preliminary heat treatment with exhaust kiln gases in an extrakiln heat exchanger before transfer to the rotary kiln.

A modification of the dry method for producing cement clinker is a process involving the preparation of a raw meal, pelletization thereof and subsequent roasting of the resultant pellets. The roasting may be effected in rotary kilns having conveyor-type calcinators, or in a dense layer in shaft furnaces or on a sintering grate with the addition of a solid fuel to the raw meal.

For providing a required temperature in the furnace units, a gaseous, liquid or solid fuel is burned. (cf. E. I. Khodorov, Furnaces for Cement Industry (in Russian), M., Gosstroyizdat Publishing House, 1968).

The production of clinker is a rather energy-consuming process due to large fuel consumption for roasting raw materials.

At present a wet method for producing cement clinker is known which comprises grinding together raw components and a solution of calcium chloride added in an amount of 10 to 20% by weight of decarbonized batch, with subsequent roasting of the resultant batch in a rotary kiln. A salt melt based on calcium chloride is formed during roasting which ensures the completion of clinker-forming reactions at 1000°–1200° C. and preparation of a clinker with high grindability, whereas in roasting the raw slurry without calcium chloride this temperature is within the range from 1350° to 1500° C. (cf. USSR Inventor's Certificate No. 326152, 1965). Lowering the roasting temperature and heat consumption and improving the grindability of the resultant clinker enable a substantial reduction of energy consumption for the process. Residual content of chloride compounds in the resultant clinker exceeds acceptable limits from the point of view of ensuring desired construction and technical properties of cement. Accordingly, the clinker is subjected to a dechlorination before cooling by reacting it with a steam and air mixture at 900°–1100° C. The dechlorination resides in a thermal hydrolysis of unbonded calcium chloride with water vapour in accordance with the following reaction:

$$CaCl_2 + H_2O = CaO + 2HCl \uparrow$$

This is an endothermic reaction which occurs with the formation of gaseous hydrogen chloride. As a result of a contact between the resultant hydrogen chloride in the gaseous phase and carbonate compounds of the raw mix regeneration of calcium chloride occurs in accordance with the following reaction:

$$CaCO_3 + 2HCl = CaCl_2 + H_2O \uparrow + CO_2.$$

This is an exothermic reaction which is accompanied by a partial decarbonization of the raw mix and release of water vapour and carbon dioxide. The resultant calcium chloride participates in the clinker-forming process.

At present the above-described process is used only in rotary kilns exhibiting low thermal and production characteristics.

Known in the art is a process for producing cement clinker, comprising dry grinding raw components, mixing the resultant raw meal with a solid fuel, pelletizing the resultant batch with concurrent addition thereto of 10–12% by weight of calcium chloride, with subsequent heat treatment of the resultant raw mix in a dense layer in zones of drying, roasting by burning a fuel over the surface of the layer with drawing fuel combustion products therethrough at 900°–1100° C. with the removal of exhaust gases released from said layer, and cooling the resultant clinker (cf. USSR Inventor's Certificate No. 303315, 1967). The temperature conditions of the above-described process cannot ensure the binding of all calcium oxide into clinker materials in the part of the layer located on the side of admission thereto of products of combustion of the fuel burnt over the layer.

The content of 10–12% by weight of calcium chloride in the raw mix fed for roasting results, in case of an accelerated roasting, in a disruption of the correlation between the process temperature and quantity of liquid salt melt required for the clinker-forming reactions to occur. The consequence of this is lowering of the speed and completeness of combustion of the fuel which is present in the raw mix which causes a decrease in the vertical rate of sintering of the raw mix in the roasting zone and an increase in the heat losses due to a mechanical underburning of solid fuel, and in a worse quality of clinker.

Forming a dense layer of raw mix pellets with uniform content of calcium chloride over the whole thickness of the layer results during roasting in a substantial increase in the calcium chloride concentration in pellets of the part of the layer located on the side of removal of exhaust gases released therefrom. The latter circumstance is due to a partial absorption by the pellets of hydrogen chloride released during the dechlorination of clinker in the foregoing parts of the layer. The above reasons result in the formation of an excessive quantity of liquid phase in the pellets causing the formation of heavy aggregates, disruption of gas permeability of the layer which results in production of clinker of poor quality and in an inadequate intensity of the roasting process.

OBJECTS OF THE INVENTION

It is an object of the invention to intensify the process of clinker roasting.

Another object of the invention is to improve quality of cement clinker.

SUMMARY OF THE INVENTION

These objects are accomplished in a process for producing cement clinker, comprising dry grinding raw components to prepare a raw meal; mixing the raw meal with a solid fuel to prepare a batch, pelletizing the resultant batch with the addition thereto of calcium chloride to obtain raw mix pellets; heat treating the resultant raw mix pellets in a dense layer; a drying zone for said heat treatment; a roasting zone for said heat treatment, wherein the process is carried out by burning a fuel over the surface of the layer and by maintaining the temperature of resultant fuel combustion products thereover at a level of 1150°–1250° C. within a portion of the roasting zone extending over a length of maximum one half of the roasting zone length with concurrent drawing of fuel combustions products through the dense pellet layer and removal of exhaust gases released therefrom, and with subsequent lowering of said temperature to 900°–1000° C. in the direction toward the cooling zone; a cooling zone for said heat treatment in which the resultant cement clinker is cooled.

The above-described temperature conditions enable a substantial intensification of the process. Temperature of fuel combustion products over the layer surface of 1150°–1250° C. makes it possible to heat through the pellet layer to a greater depth, increase the degree of decarbonization of the raw mix and accelerate the formation of a liquid melt of calcium chloride. Owing to an increase in the degree of decarbonization of the raw mix, the conditions for burning the solid fuel present in the raw mix are improved. As the amount of heat introduced into the layer with the fuel combustion products and the amount of heat released in burning the solid fuel in the pellet layer owing to better conditions for its burning increase, the temperature in the zone of fuel combustion within the layer also increases.

The latter circumstance is favourable for an increase in the rate and completion of clinker-forming reactions. Reactions of formation of clinker minerals in pellets in the part of the layer located on the side of entry thereto of fuel combustion products burnt over the layer are mainly completed to the middle of the roasting zone. Within the following part of the roasting zone the temperature of fuel combustion products over the layer is gradually lowered to 900°–1000° C. in the direction toward the cooling zone (the temperature of clinker dechlorination reaction) since fuel combustion products are heated by the physical heat of the resultant clinker when drawn through the layer and enter the underlying strate at a temperature which is higher than that at which they were before entering the layer.

To increase the rate and completeness of solid fuel combustion, improve the throughput capacity of a roasting plant and quality of clinker, it is preferred to subject to the heat treatment pellets of a raw mix having the following composition (in % by weight):

clayey component: 20–22
ferrugineous component: 2.0–3.0
calcium chloride: 3.0–5.0
solid fuel: 2.0–8.0
limestone component: up to 100.

For a more complete utilization of hydrogen chloride released during the process, improvement of environment protection and lowering specific fuel consumption, it is preferred to mix the exhaust gases released from the dense pellet layer in the roasting zone with the raw meal in an amount of 1 to 30% by weight of the raw meal mixed with the solid fuel, with their subsequent return back to the drying zone and drawing through said pellet layer.

To improve the heat- and mass-exchange conditions and quality of clinker, it is preferred to form in said dense pellet layer within the middle portion of the roasting zone holes to a depth of 40 to 60% of the layer thickness, and to form holes to a depth of 90 to 95% of the layer thickness at a distance from the boundary between the roasting and cooling zones equal to between 5 and 15% of the roasting zone length.

To impove quality of the resultant cement clinker, it is preferred to use a dense layer which consists of raw mix pellets of different moisture contents, a part of the layer over its whole length on the side of removal of exhaust gases released therefrom being made 30–100 mm thick and formed from pellets predried to a maximum moisture content of 3%.

To improve the throughput capacity of a roasting plant and quality of the resultant clinker, it is preferred to add to the batch before pelletizing calcium chloride in an amount of 5 to 80% by its weight in the raw mix, the remaining quantity of calcium chloride being added during pelletization.

To improve quality of clinker, it is preferred to additionally feed onto the layer in the middle part of the roasting zone pellets of a raw mix of a moisture content of maximum 3% in an amount of 5 to 30% by weight of the raw mix pellets subjected to the heat treatment.

It is preferred to make a part of the dense layer over its whole length on the side of removal of exhaust gases released therefrom with a thickness of 10 to 30% of the total layer thickness and to form this part from raw mix pellets containing 0.5 to 2% by weight of calcium chloride, the remaining part of the layer being formed from raw mix pellets containing 3 to 5% by weight of calcium chloride.

To improve the quality of the cement clinker and mass-exchange within the pellet layer in the roasting zone, it is preferred during pelletization to form pellets of a spherical shape from the raw mix, which consist of a core and an envelope, with the ratio between masses of the envelope and core of 0.3–3.0, the core of said pellet being formed from a raw mix containing 5 to 8% by weight of calcium chloride, and the envelope being formed from a raw mix containing 1.0 to 2.0% by weight of calcium chloride.

DETAILED DESCRIPTION OF THE INVENTION

The process according to the invention is carried out in the following manner.

A raw meal of a predetermined chemical composition is prepared by dry grinding and concurrently drying a mixture of predetermined quantities of limestone, clayey and ferrugineous components. The raw meal is adjusted in composition, homogenized, and stored in silos. A batch is prepared by mixing the raw meal with a solid fuel comminuted to a desired size. The resultant batch is then pelletized with concurrent addition of calcium chloride thereto.

As an alternative, a part of calcium chloride (in an amount of between 5 and 80% by its weight in the raw mix) may be added during the preparation of the batch, the remaining part being added during pelletization of the batch. This method of adding calcium chloride to the batch ensures uniform distribution thereof over the mass of raw mix, improves throughput capacity of the plant and degree of dechlorination of clinker.

During pelletization pellets of raw mix 6–12 mm in diameter with a moisture content of between 8 and 12% are prepared.

Depending on the temperature conditions of the heat treatment process pellets of raw mixes with a predetermined content of calcium chloride are used. The raw mix of the following composition (in % by weight) is preferred for the process according to the invention:

clayey component: 20.0–22.0
ferrugineous component: 2.0–3.0
calcium chloride: 3.0–5.0
solid fuel: 2.0–8.0
limestone component: up to 100.

The content of calcium chloride below 3% by weight cannot provide for the desired quantity of salt melt for the occurrence of reactions of low-temperature clinker formation, and its content over 5% would result in a disruption of the sintering process under the temperature conditions in the roasting zone according to the invention. The range of contents of a solid fuel is dictated by the possibility of using various kinds of solid fuel (coke fines, coal, anthracites, brown coals) with different combustion heat. The content of limestone, ferrugineous and clayey components is determined by desired properties of the raw meal (coefficient of saturation, silicate and alumina moduli).

The resultant raw mix pellets are subjected to a heat treatment in a dense layer by drawing (drafting) therethrough a heat carrier consecutively in the zones of drying, roasting and cooling.

In order to improve the quality of resultant clinker, it is preferred that the dense layer consist of raw mix pellets differing in moisture content, a part of the layer over the whole length thereof on the side of removal of exhaust gases released therefrom being 30 to 100 mm thick and formed from pellets predried to a moisture content of a maximum 3%.

The employment of such a layer makes it possible to acclerate heating of pellets in this part of the layer and ensures the coincidence of the rates of displacement of fronts of heat transfer and burning of a solid fuel which is present in the raw mix. The latter circumstance enables an increase in the maximum temperature in the layer, hence more complete clinker-forming reactions.

To improve the conditions for the clinker-forming reactions, a part of the dense layer over its whole length on the side of removal of exhaust gases released therefrom should be of a thickness of 10 to 30% of the total layer thickness and this part of the layer should be formed from raw mix pellets containing between 0.5 and 2% by weight of calcium chloride, the remaining part of the layer being formed from raw mix pellets containing between 3 and 5% by weight of calcium chloride. This arrangement of the layer prevents pellets from strongly sintering together in this part of the layer with the formation of agglomerations and deceleration of the entire production process.

The resultant dense layer of raw mix pellets is first fed to a drying zone wherein the pellets are dried with heat of a heat carrier which is drawn through the layer and which is at a temperature between 400° and 600° C. The heated pellets are then admitted to a roasting zone wherein a fuel is burnt over the surface of the pellet layer with drawing of the resultant combustion products through the pellet layer and with removal of the exhaust gases released therefrom. The temperature of the combustion products over the layer within a portion of the roasting zone extending over a length of maximum one half of the roasting zone length is maintained at a level of 1150° to 1250° C. with lowering of this temperature to 900°–1000° C. in the direction toward the cooling zone.

For burning a fuel in the roasting zone, the use is made of hot air taken from the clinker cooling zone, the air at 250°–350° C. being fed for fuel combustion (with an air excess ratio $\alpha_1 = 1.0–1.1$), and air at a temperature between 600° and 700° C. is used for dilution of fuel combustion products so as to maintain the desired temperature of the combustion products over the layer. The excess ratio of this air is determined by the need to obtain the desired temperature of fuel combustion products over the layer. Gradual lowering of this temperature over the layer to 900°–1000° C. is ensured by gradually increasing the air excess ratio or by recirculating fume gases.

Owing to the presence of an adequate quantity of oxygen in the fuel combustion products drawn through the pellet layer, the solid fuel which is present in the raw mix is burnt.

Combustion of solid fuel in the raw mix pellets occurs within a narrow zone of the layer which is 20 to 30 mm thick (the zone of solid fuel combustion). Heat flows into this zone with the fuel combustion products drawn through the pellet layer. Owing to a concentration of a substantial amount of heat within a small volume of the layer in the solid fuel combustion zone, high temperature (1200°–1250° C.) is achieved which is favourable for low-temperature clinker-forming reactions.

The solid fuel combustion zone in which sintering of the raw mix and formation of clinker materials occur is continuously moving in the direction of flow of the heat carrier which is drawn through the pellet layer. The intensity of roasting of clinker in the dense layer is characterized by the vertical sintering rate which is determined as a ratio of the layer thickness to the time from the moment the layer enters the roasting zone to the moment the solid fuel combustion zone leaves the layer.

As the fuel combustion products drawn through the dense pellet layer contain a sufficient quantity of water vapour, the resultant clinker downstream the solid fuel combustion zone is dechlorinated. Hydrogen chloride is released in the form of the gaseous phase. The content of hydrogen chloride in gases escaping from the layer in the roasting zone is between 0.5 and 1.5 vol.%.

To protect the environment and utilize the heat of gases removed from the roasting zone, these gases are mixed with the raw meal in an amount of 1 to 35% by weight of the raw meal which is mixed with a solid fuel to return them back to the drying zone and draw them through the layer of wet pellets.

Upon adding the raw meal to the flow of gases removed from the roasting zone, owing to a very large contact area at the interface of the raw meal particles and the gases, an intense heating of the raw meal and absorption of hydrogen chloride with carbonate compounds of the raw meal occur. The process of absorption of hydrogen chloride with the raw meal is accompanied by a partial decarbonization of the raw meal and the formation of chlorides, that is the process of regeneration of chlorides occurs.

When the dust and gas flow is drawn through the layer of wet pellets in the drying zone, gases are cleaned from the raw meal owing to a high filtering capacity of wet pellets. Drying and heating of the raw mix pellets take place due to the heat of exhaust gases, whereby fuel consumption is reduced and engineering and economic performance of the process is improved. Hydrogen chloride which is not absorbed with the raw meal is utilized with wet raw mix pellets substantially completely during the drawing of gases through the layer of wet pellets owing to a very large contact area.

During the heat treatment of the dense pellet layer a strong sintering of pellets together may occur in the part of the layer on the side of entrance of fuel combustion products from the fuel burned over the layer. This causes a lowering of the gas permeability of the layer thus hampering the sintering process and impairing the quality of clinker.

In order to intensify the heat- and mass-exchange processes and improve the quality of clinker, holes are formed in the dense layer of pellets in the middle portion of the roasting zone to a depth of 40 to 60% of the layer thickness, and holes to a depth of 90 to 95% of the layer thickness are formed at a distance to the boundary between the roasting and cooling zones equal to 5 to 15% of the roasting zone length.

Clinker produced in the part of the layer on the side of entrance of fuel combustion products is subjected to a prolonged action of high temperature which causes a partial decomposition of highly basic calcium silicate which is accompanied by an increase in the content of free calcium oxide in the clinker and impairing of clinker quality.

In order to improve quality of the clinker, pellets of the raw mix predried to a moisture content of maximum 3% are additionally fed onto the pellet layer in the middle portion of the roasting zone. The quantity of these pellets is between 5 and 30% by weight of the raw mix pellets which are subjected to the heat treatment.

During the heating of the raw mix pellets in the roasting zone before inflammation of solid fuel which is present in the raw mix a gasification of fuel occurs. Gasification products diffuse to the pellet surface and are burnt thereon to result in a material increase in its temperature. In order to prevent the pellet surface from oversintering which would result in a lower porosity thereof and impaired conditions of mass exchange between the internal part of the pellet and the ambient gas medium, it is desirable to form the surface layers of the pellet from a raw mix with a low content of calcium chloride.

In order to intensify processes of combustion of a solid fuel in pellets of the raw mix and processes of dechlorination of the resultant clinker and improve clinker quality, pellets of spherical shape are subjected to the heat treatment, which have a core and an envelope and which are formed from raw mixes with different contents of calcium chloride. The raw mix forming the envelope of the pellet contains between 1.0 and 2.0% by weight of calcium chloride, and the raw mix forming the core of the pellet contains between 5 and 8% by weight of calcium chloride.

An increased content of calcium chloride in the raw mix forming the core of the pellet (5–8% by weight) is necessary for the formation of a salt melt in an amount sufficient for the completion of clinker-forming reactions over the entire volume of the pellet. Upon appearance of a melt of calcium chloride, migration of this melt from portions with high concentration thereof to portions with low concentration thereof, that is from the central portion of the pellet to its surface layers occurs. As a result, the concentration of calcium chloride becomes uniform over the whole volume of the pellet. Finally, before the process of sintering starts, the pellet completely consists of a raw mix containing between 3 and 5% by weight of calcium chloride.

The above-described pellets are prepared by pelletizing cores from one kind of raw mix with subsequent application of an envelope made from another raw mix to the core. The ratio of masses of the envelope and core is 0.3–3.0.

After leaving the roasting zone, the layer of the resultant clinker enters the cooling zone. The clinker is cooled by drawing a cool air or an air and water suspension therethrough, the suspension being produced by spraying water in an air stream.

In the latter case, an increased moisture content of the air fed from the cooling zone into the roasting zone is favourable for the dechlorination of clinker.

Cement is prepared by grinding the resultant clinker with necessary additives.

Therefore, the process according to the invention makes it possible to intensify the roasting process concurrently with an improvement of clinker quality, and also ensures the protection of the environment against noxious pollutions.

The invention will now be explained in detail with reference to the specific embodiments illustrated by Examples.

EXAMPLE 1

A raw meal of the following composition (in % by weight) was prepared by grinding together limestone, clay and superphosphate residues (ferrugineous component) with concurrent drying: limestone 75.0%, clay 22.8%, residues 2.2%. A batch containing 95.8% by weight of the raw meal and 4.2% by weight of coal was prepared by mixing the resultant raw meal and coal with the calorific capacity of 5800 kcal/kg comminuted to a particle size smaller than 1.5 mm. A raw mix containing 96% by weight of the batch and 4% of calcium chloride was prepared by pelletizing the batch with the addition of calcium chloride.

As a result of the pelletization pellets of 6–12 mm in diameter with a moisture content of 9% where obtained which consisted of the raw mix of the following composition (% by weight):

limestone: 69
clay: 21
superphosphate cinders: 2
coal: 4
calcium chloride: 4.

The pellets were then placed on a grate in the form of a dense layer 400 mm thick and were subjected to a heat treatment consecutively in the zones of drying, roasting and cooling. Pellets were dried in the drying zone and heated by drawing through the pellet layer a heat carrier at 450° C. In the roasting zone a fuel was burnt over the surface of the dense pellet layer with drawing of the resultant combustion products through the layer. The temperature of the fuel combustion products at the entrance to the layer was maintained equal to 1200° C. within the starting portion of the roasting zone extending over ⅓ of the roasting zone length. A gradual lowering of this temperature was effected to 1000° C. over the remaining part of the roasting zone.

For fuel combustion, air at 300° C. was fed from the cooling zone of clinker on the grate (the air excess ratio was $\alpha_1 = 1.05$). The temperature of fuel combustion products over the layer at 1200° C. was maintained by diluting them with hot air at 600° C. fed from the clinker cooling zone. The air excess ratio in this case was $\alpha_2=1.0$. The gradual lowering of temperature of fuel combustion products at the entrance to the layer to 1000° C. was effected by gradually raising the air excess ratio for the air fed for the dilution up to $\alpha_2=2.0$.

Gases leaving the layer in the drying zone contained 0.189% by volume of hydrogen chloride. Clinker was cooled in the cooling zone by drawing cool air through its layer. Cement was prepared by grinding the clinker with additives.

The resultant clinker contained 1.5% by weight of free calcium oxide ($CaO_{free}$), 2.8% by weight of chlorine-ion ($Cl^-$), 0.41% by weight of residual carbon from solid fuel present in the raw mix, and 61% by weight of highly basic calcium silicate. The ultimate compression strength of cement samples prepared on the basis of this clinker was 435 kgf/cm².

The specific output of the grate was 0.48 t/m²-h, the vertical sintering rate was 18.0 mm/min, the specific fuel consumption was 620 kcal per 1 kg of clinker.

EXAMPLE 2

A raw meal containing 75.0% by weight of limestone, 22.8% by weight of clay, and 2.2% by weight of superphosphate cinders (ferrugineous component) was prepared by dry grinding with concurrent drying. A batch containing 91.7% by weight of the raw meal and 8.3% by weight of brown coal was prepared by mixing the resultant raw meal with brown coal with the calorific capacity of 3200 kcal/kg comminuted to a particle size of less than 2.5 mm. Pellets of raw mix of the following composition (in % by weight) were then prepared by pelletizing the resultant batch with the addition of calcium chloride:

limestone: 66
clay: 20
cinders: 2
brown coal: 8.0
calcium chloride: 4.0

Further heat treatment of the pellets of the raw mix was conducted as described in Example 1.

The resultant climker contained 2.0% by weight of CaO free, 1.9% by weight of $Cl^-$. The specific output of the grate was 0.5 tons/m²-h, the vertical sintering rate as 18 mm/min.

EXAMPLE 3

A raw meal containing 75.5% by weight of limestone, 22.4% by weight of clay, and 2.1% by weight of superphosphate cinders (ferrugineous component) was prepared by dry grinding and concurrent drying. A batch was prepared by mixing the resultant raw meal with coke fines with the calorific capacity of 76000 kcal/kg comminuted to a particle size of less than 1.5 mm, the batch containing 97.9% by weight of the raw meal and 2.1% by weight of coke fines. Pellets of raw mix of the following composition (in % by weight) were prepared by pelletizing the resultant batch with the addition of calcium chloride:

limestone: 71
clay: 21
cinders: 2
coke fines: 2.0
calcium chloride: 4

Further heat treatment of the raw mix pellets was conducted as described in Example 1.

The resultant clinker contained 1.5% by weight of $CaO_{free}$, 2.0% by weight of $Cl^-$. The specific output of the grate was 0.52 tons/m²-h, the vertical sintering rate as 19 mm/min.

EXAMPLE 4

The process was carried out as described in Example 1 with the only difference in that calcium chloride in an amount of 40% by its weight in the raw mix fed for heat treatment was added to the batch before starting pelletization, the remaining part (60%) of calcium chloride being added during pilletization. The resultant pellets of raw mix were subjected to the heat treatment.

The resultant clinker contained 1.1% by weight of $CaO_{free}$, 2.4% by weight of $Cl^-$. The specific output of the grate was 0.51 tons/m²-h, the vertical sintering rate was 19.0 mm/min.

EXAMPLE 5

The process was carried out as described in Example 1 with the only difference in that 15% of wet pellets were dried to the moisture content of 1.5%. The dried pellets at 120° C. were placed on the grate in a layer 70 mm thick. A layer of wet pellets 480 mm thick was placed thereon. The layer which was thus formed was subjected to the heat treatment. The resultant clinker contained 1.2% by weight of $CaO_{free}$ and 2.3% by weight of $Cl^-$. The specific output of the plant was 0.52 tons/m²-h, the vertical sintering rate was 19.5 mm/min.

EXAMPLE 6

The process was carried out as described in Example 1, with the only difference in that gases released from the layer in the roasting zone containing 1.0 vol.% of hydrogen chloride were mixed with the raw meal in an amount of 15% by weight of the raw meal present in the raw mix.

The resultant dust and gas flow at 450° C. was returned back to the drying zone and drawn through the layer of wet pellets. Gases released from the layer in the drying zone contained 0.0001 vol.% of hydrogen chloride. The specific heat consumption for the process was 604 kcal per 1 kg of clinker. The specific output of the grate was 0.57 tons/m²-h.

EXAMPLE 7

The process was carried out as described in Example 1, with the only difference in that vertical cylindrical holes to a depth of 50% of the layer thickness were formed in the middle part of the roasting zone in the dense layer of pellets. The hole diameter was 10 mm and the spacing was 80 mm. The same holes to a depth of 90% of the layer thickness were formed in the layer at a distance to the boundary between the roasting and cooling zones equal to 10% of the roasting zone length. The clinker produced in the half of the layer on the side of removal of exhaust gases released therefrom contained 1.3% by weight of $CaO_{free}$ and 2.7% by weight of $Cl^-$. The clinker produced from the whole layer contained 1.2% by weight of $CaO_{free}$ and 2.2% by weight of $Cl^-$. The vertical sintering rate was 20.0 mm/min, the specific output of the grate was 0.53 tons/m²-h.

EXAMPLE 8

The process was carried out as described in Example 1 with the only difference in that pellets of raw mix predried to the moisture content of 2.5% were additionally fed onto the main layer in the middle part of the roasting zone. The amount of additionally fed pellets was 20% by weight of the pelletized raw mix subjected to the heat treatment.

The clinker produced from the part of the main layer 50 mm thick on the side of entrance of fuel combustion products the layer contained 0.9% by weight of $CaO_{free}$, 1.9% by weight of $Cl^-$, and 67% by weight of highly basic calcium silicate. The clinker produced from the additionally fed pellets contained 1.1% by weight of $CaO_{free}$, and 2.4% by weight of chlorine ion. The specific output of the grate was 0.57 tons/m²-h, the vertical sintering rate was 20.8 mm/min.

EXAMPLE 9

The process was carried out as described in Example 1 with the only difference in that the resultant pellets of raw mix contained 98% by weight of the batch and 2.1% by weight of calcium chloride. The pellets were placed on the grate in a layer 150 mm thick. Subsequently a layer of raw mix pellets with the composition as described in Example 1 was placed thereon in a layer 350 mm thick. The resultant pellet layer was subjected to the heat treatment.

The resultant clinker contained 1.0% by weight of free calcium oxide 2.1 by weight of $Cl^-$, and 0.2% by weight of residual solid fuel carbon.

The specific output of the grate was 0.56 tons/m²-h, the vertical sintering rate was 21.0 mm/min.

EXAMPLE 10

The process was carried out as described in Example 1 with the only difference in that the resultant pellets of raw mix contained 99.5% by weight of the batch and 0.5% by weight of calcium chloride. The pellets were placed on the grate in a layer 60 mm thick. A layer of raw mix pellets 540 mm thick was placed thereon, with the composition of the raw mix as described in Example 1. The resultant layer of pellets was subjected to the heat treatment.

The resultant clinker contained 1.1% by weight of $CaO_{free}$, 2.0% by weight of chlorine ion, and 0.15% by weight of residual solid fuel carbon. The specific output of the grate was 0.57 tons/m²-h, the vertical sintering rate was 21.4 mm/min.

EXAMPLE 11

A batch of the composition as described in Example 1 was prepared. Pellets 9 mm in diameter of a raw mix containing 95% by weight of the batch and 5% of calcium chloride were then prepared by pelletizing the batch with concurrent addition of calcium chloride. At the same time, a raw mix containing 98% by weight of the batch and 2% by weight of calcium chloride were prepared by mixing the batch with calcium chloride. An envelope from the second raw mix was then rolled over the 9 mm pellets of the first raw mix, with the envelope thickness being of about 0.5 mm. The amount of the second raw mix consumed for forming the envelopes of pellets was about 30% by weight of the pellets from the first raw mix to which the envelope was applied. The resultant pellets of about 10 mm in diameter were placed on the grate in a layer of 500 mm thick and subjected to the heat treatment as described in Example 1.

The resultant clinker contained 0.9% by weight of $CaO_{free}$ 2.2% by weight of chlorine ion, and 0.27% by weight of residual solid fuel carbon. The specific output of the grate was 0.55 tons/m²-h, the vertical sintering rate was 20.9 mm/min.

EXAMPLE 12

A batch of the composition as described in Example 1 was prepared. Pellets of 6 mm in diameter were then prepared by pelletizing the batch with concurrent addition of calcium chloride, the pellets consisting of a raw mix containing 92% by weight of the batch and 8% by weight of calcium chloride. At the same time a raw mix containing 99% by weight of the batch and 1.0% by weight of calcium chloride was prepared. Subsequently an envelope from the second raw mix of about 1.5 mm thick was rolled over the 6 mm pellets of the first raw mix. The amount of the second raw mix applied to the pellets was 300% by weight of the pellets formed from the first raw mix to which the envelope was applied. The resultant pellets of about 9 mm in diameter were placed on the grate in a layer 550 mm thick and subjected to the heat treatment as described in Example 1.

The resultant clinker contained 1.2% by weight of $CaO_{free}$, 1.9% by weight of chlorine ion, 0.21% by weight of residual solid fuel carbon. The specific output of the grate was 0.53 tons/m²-h, the vertical sintering rate was 19.8 mm/min.

EXAMPLE 13

A raw meal containing 76.0% by weight of limestone, 21.8% by weight of clay, and 2.2% by weight of cinders was prepared by grinding together and concurrently drying limestone, clay and superphosphate cinders (ferrugineous component). A batch containing 94.8% by weight of the raw meal and 5.2% by weight of coal was prepared by mixing the resultant raw meal with coal having the calorific capacity of 5800 kcal/kg comminuted to a particle size of less than 2.0 mm.

Calcium chloride was added to the batch in the following manner: a part of calcium chloride (5% of the total quantity to be added to the batch) was added before pelletization, and the remaining quantity (95%) was added during pelletization. After pelletization, pellets of the moisture content 10% and 7–10 mm in diameter were obtained which consisted of a raw mix having the following composition (in % by weight):

limestone: 70.0
clay: 20.0
superphosphate cinders: 2.0
coal: 5.0
calcium chloride: 3.0

A part of the resultant pellets in an amount of 5% were dried to the moisture content of 1.0% before feeding them to the grate. The dried pellets at 130° C. were placed on the grate in a layer 30 mm thick. A layer 420 mm of the wet pellets was placed thereon.

The dense layer of pellets formed on the grate as described above was subjected to the heat treatment consecutively in the drying, roasting and cooling zones. Pellets were dried and heated in the drying zone by drawing through the layer a heat carrier at 500° C. In the roasting zone, a fuel was burned over the pellet layer with drawing the fuel combustion products through the layer. The temperature of the fuel combustion products at the entrance to the layer was maintained at 1150° C. within the starting portion of the roasting zone extending over one half of the roasting zone length. A gradual lowering of this temperature to 1000° C. was effected over the remaining part of the roasting zone in the direction toward the cooling zone.

Air at 350° C. was fed from the clinker cooling zone on the grate for fuel combustion with the air excess ratio $\alpha_1 = 1.0$. The temperature of fuel combustion products equal to 1150° C. was maintained by diluting them with hot air at 700° C. fed from the clinker cooling zone. The excess ratio of this air was $\alpha_2 = 1.4$. The gradual lowering of the temperature to 1000° C. was effected by gradually increasing this air excess ratio to $\alpha_2 = 2.3$. The exhaust gases released from the layer within the roasting zone containing 0.65 vol.% of hydrogen chloride were mixed with the raw meal in an amount of 1.0% by weight of the raw meal mixed with a solid fuel. The resultant dust and gas flow at 500° C. was returned back to the drying zone and drawn through the layer of wet pellets. The gases released from the layer within the drying zone contained 0.009 vol.% of hydrogen chloride.

Vertical cylindrical holes to a depth of 40% of the layer thickness were formed in the layer within the middle part of the roasting zone. The hole diameter was 20 mm, the spacing was 120 mm. The same holes to a depth of 90% of the layer thickness were formed in the layer at a distance of 15% of the roasting zone length to the boundary between the roasting and cooling zones. The clinker produced in the half of the layer on the side of removal of exhaust gases released therefrom contained 1.2% by weight of $CaO_{free}$ and 2.6% by weight of $Cl^-$.

Pellets of a raw mix predried to the moisture content 1.0% were additionally fed onto the main pellet layer within the middle part of the roasting zone. The amount of the additionally fed pellets was 5% by weight of the pelletized raw mix subjected to the heat treatment. The clinker produced from the part of the main layer 50 mm thick on the side of entrance of fuel combustion products contained 1.1% by weight of $CaO_{free}$, 2.0% by weight of $Cl^-$, and 65% by weight of highly basic calcium silicate. The clinker produced from the additionally fed pellets contained 1.0% by weight of $CaO_{free}$ and 2.1% by weight of $Cl^-$.

Clinker with an average layer temperature of 950° C. moved from the roasting zone to the cooling zone wherein it was cooled to an average layer temperature of 80° C. by blasting cool air (t=20° C.). The resultant clinker contained 1.1% by weight of $CaO_{free}$, 2.1% by weight of $Cl^-$, 0.3% by weight of residual solid fuel carbon, and 72% by weight of highly basic calcium silicate. The utlitmate compression strength of cement samples prepaed on the basis of this clinker was 507 kgf/cm² at the age of 28 days. The specific output of the grate was 0.6 tons/m²-h, the vertical sintering rate was 22.3 mm/min., the specific heat consumption was 61.3 kcal per 1 kg of clinker.

EXAMPLE 14

A raw meal containing 74.5% by weight of limestone, 22.8% by weight of clay, and 2.7% by weight of cinders was prepared by grinding together with concurrent drying of limestone, clay and superphosphate cinders (ferrugineous component). A batch containing 95.8% by weight of the raw meal and 4.2% by weight of coal was prepaed by mixing the resultant raw meal with coal having the calorific capacity of 5800 kcal/kg comminuted to a particle size of less than 2.0 mm. Calcium chloride was added to the batch in the following manner: a part of calcium chloride (60% of the total quantity to be added to the batch) was added before pelletization, and the remaining quantity (40%) was added during pelletization. Pellets with the moisture content of 8% and 7-10 mm in diameter were obtained after pelletization, which had the following composition of a raw mix (in % by weight):

limestone: 68.5
clay: 21
superphosphate cinders: 2.5
coal: 4
calcium chloride: 4

A part of the resultant pellets in an amount of 10% were dried to the moisture content of 2.0% before feeding to the grate. Drying was effected with air at 300° C. fed from the clinker cooling zone. The dried pellets at 125° C. were placed on the grate in a layer 50 mm thick. A layer 450 mm of wet pellets was placed thereon. The dense pellet layer formed as described above on the grate was subjected to the heat treatment in drying, roasting and cooling zones.

Pellets were dried and heated in the drying zone by drawing through the layer a heat carrier at 450° C. Fuel was burnt in the roasting zone over the surface of the pellet layer. The fuel combustion products temperature at the entrance to the layer was maintained at 1200° C. within the starting portion of the roasting zone extending over ⅓ of the raosting zone length. A gradual lowering of this temperature to 900° C. was effected over the remaining part of the roasting zone in the direction toward the cooling zone.

Air at 300° C. was fed for fuel combustion over the layer from the clinker cooling zone on the grate with its excess ratio $\alpha_1 = 1.05$. The temperature of fuel combustion products equal to 1200° C. was maintained by diluting the fuel combustion products with hot air at 650° C. fed from the clinker cooling zone. This air was fed with an excess ratio $\alpha_2 = 1.1$. The gradual lowering of the temperature to 900° C. was effected by gradually increasing the air excess ratio to $\alpha_2 = 3.1$.

The fuel combustion products formed over the layer were drawn through the pellet layer in the roasting zone. Gases released from the layer in the roasting zone containing 1.1 vol.% of hydrogen chloride were mixed with the raw meal in an amount of 10% by weight of the raw meal mixed with the solid fuel.

The resultant dust and gas flow at 450° C. was returned back to the drying zone and drawn through the layer of wet pellets. The gases released from the layer in the drying zone contained 0.0003 vol.% of hydrogen chloride.

Vertical cylindrical holes to a depth of 55% of the layer thickness were formed within the middle part of the roasting zone in the layer. The hole diameter was 15 mm, the spacing was 100 mm. The same holes to a depth of 93% of the layer thickness were formed at a distance of 8% of the roasting zone length from the boundary between the roasting and cooling zones. The clinker produced in the half of the layer on the side of removal of exhaust gases released therefrom contained 1.1% by weight of $CaO_{free}$ and 2.4% by weight of $Cl^-$. Pellets of the raw mix predried to the moisture content of 2.0% were additionally fed to the main pellet layer within the middle part of the roasting zone. The amount of the additionally fed pellets was 10% by weight of the pelletized raw mix subjected to the heat treatment. The clinker produced in the part of the main layer 50 mm thick on the side of entrance of the fuel combustion products to the layer contained 1.0% by weight of $CaO_{free}$, 2.1% by weight of $Cl^-$, and 66% by weight of highly basic calcium silicate. The clinker produced from the additionally fed pellets contained 1.1% by weight of $CaO_{free}$ and 2.2% by weight of $Cl^-$. Clinker with an average layer temperature of 850° C. was fed from the roasting zone to the cooling zone wherein it was cooled to an average layer temperature of 70° C. by blasting cool air (t=20° C.). The resultant clinker contained 1.0% by weigth of $CaO_{free}$, 22% by weight of $Cl^-$, 0.26% by weight of residual solid fuel carbon, and 73% by weight of highly basic calcium silicate. The ultimate compression strength of cement samples prepared on the basis of this clinker was 538 $kgf/cm^2$ at the age of 28 days.

The specific output of the grate was 0.65 tons/$m^2$-h, the vertical sintering rate was 228 mm/min, the specific heat consumption was 597 kcal per 1 kg of clinker.

EXAMPLE 15

A raw meal containing 72.6% by weight of limestone, 24.2% by weight of clay, and 3.2% by weight of superphosphate cinders was prepared by grinding together with concurrent drying limestone, clay and superphosphate cinders. A batch containing 95.8% by weight of the raw meal and 4.2% by weight of coal was prepared by mixing the resultant raw meal with coal having the calorific capacity of 5800 kcal/kg comminuted to a particle size of less than 2.0 mm.

Calcium chorlide was added to the batch in the following manner: a part of calcium chloride (80% of the total quantity to be added to the batch) was added before pelletization and the remaining part (20%) was added during pelletization. Pellets with the moisture content of 9% and 7–10 mm in diameter were obtained after pelletization, which contained a raw mix of the following composition (in % by weight):

limestone: 66
clay: 22
superphosphate cinders: 3.0
coal: 4
calcium chloride: 5

A part of the resultant pellets in an amount of 15% were dried to the moisture content of 3.0% before feeding them to the grate. Drying was effected with air at 250° C. fed from the clinker cooling zone. The dried pellets a 120° C. were placed in a layer 100 mm thick on the grate. A layer 400 mm thick of wet pellets was placed thereon. The dense pellet layer formed on the grate as described above was subjected to the heat treatment during the movement of the grate consecutively through the drying, roasting and cooling zones. The pellets were dried and heated in the drying zone by drawing through the layer a heat carrier at 400° C. A fuel was burned in the roasting zone over the surface of the pellet layer. The temperature of the combustion products at the entrance to the layer was maintained at 1250° C. within the starting portion of the roasting zone on the side of entrance of the layer thereto extending over 1/6 of the roasting zone length. A gradual lowering of this temperature to 1000° C. was effected over the remaining part of the roasting zone in the direction toward the cooling zone.

Air at 250° C. was fed for fuel combustion over the layer from the clinker cooling zone on the grate with the air excess ratio of $\alpha_1 = 1.1$. The temperature of fuel combustion products was maintained at 1250° C. by diluting them with hot air at 600° C. fed from the clinker cooling zone. This air excess ratio was $\alpha_2 = 0.9$. The gradual lowering of the temperature to 1000° C. was effected by gradually increasing this air excess ratio to $\alpha_2 32\ 2.0$.

The fuel combustion products formed over the layer were drawn through the pellet layer in the roasting zone. Gases released from the layer within the roasting zone containing 1.4 vol.% of hydrogen chloride were mixed with the raw meal in an amount of 30% by weight of the raw meal present in the raw mix.

The resultant dust and gas flow at 400° C. was returned back to the drying zone and drawn through the layer of wet pellets. Gases released from the layer within the drying zone contained substantially no hydrogen chloride.

Vertical cyclindrical holes to a depth of 60% of the layer thickness were formed in the layer within the middle part of the roasting zone. The hole diameter was 5 mm, the spacing 60 mm. The same holes to a depth of 95% of the layer thickness were formed in the layer at a distance of 5% of the roasting zone length from the boundary between the roasting and cooling zones. The clinker produced in the half of the layer on the side of removal of the exhaust gases contained 1.0% by weight of $CaO_{free}$ and 2.3% by weight of $Cl^-$. Pellets of the raw mix predried to the moisture content of 3.0% were additionally fed to the main pellet layer in the middle part of the roasting zone. The amount of the additionally fed pellets was 30% by weight of the pelletized raw mix subjected to the heat treatment. The clinker produced in the part of the main layer 50 mm thick on the side of entrance of the fuel combustion products formed over the layer contained 0.8% by weight of $CaO_{free}$, 2.3% by weight of $Cl^-$, and 69% by weight of highly basic calcium silicate. The clinker produced from the additionally fed pellets contained 1.2% by weight of $CaO_{free}$ and 2.4% by weight of $Cl^-$.

The clinker with an average layer temperature of 900° C. was fed from the roasting zone to the cooling zone wherein it was cooled to an average layer temperature of 75° C. by blasting cool air (t=20° C.). The resultant clinker contained 1.2% by weight of $CaO_{free}$, 2.4% by weight of $Cl^-$, 0.29% by weight of residual solid fuel carbon, and 75% by weight of highly basic calcium silicate. The ultimate compression strength of cement samples prepared from this clinker was 549 $kgf/cm^2$ at the age of 28 days.

The specific output of the grate was 0.67 tons/$m^2$-h, the vertical sintering rate was 22.5 mm/min, the specific heat consumption 590 kcal per 1 kg of clinker.

EXAMPLE 16

The process was carried out as described in Example 14, but concurrently with the preparation of pellets of the main raw mix, pellets of another raw mix containing 99% by weight of the batch and 1.0% by weight of calcium chloride were prepared. Composition of the batch and the method of adding calcium chloride thereto were as described in Example 14. The amount pellets of the latter raw mix was 25% by weight of the pellets of the main raw mix. These pellets were dried to the moisture content of 2.0%. The dried pellets heated to 125° C. were placed on the grate in a layer 100 mm thick. A layer of wet pellets of the main raw mix were placed thereon in a layer 400 mm thick. The layer which was thus formed was subjected to the heat treatment.

The resultant clinker contained 0.7% by weight of $CaO_{free}$, 2.0% by weight of chlorine ion, 0.11% by weight of residual solid fuel carbon, and 76% by weight of calcium silicate.

The specific output of the grate was 0.69 tons/m²-h, the vertical sintering rate was 26.2 mm/min, the specific heat consumption 580 kcal/per 1 kg of clinker.

EXAMPLE 17

A batch of the composition as described in Example 1 was prepared. Pellets about 8 mm in diameter were prepared from the batch by pelletizing it with the additio of calcium chloride by the method described in Example 14, the pellets being formed from a raw mix containing 93.5% by weight of the batch and 6.5% by weight calcium chloride. At the same time, a raw mix containing 98.5% by weight of the batch and 1.5% by weight of calcium chloride was prepared by mixing the batch with calcium chloride. An envelope about 1.0 mm thick from the second raw mix was then rolled over the prepared pellets 8 mm in diameter formed from the first raw mix.

The quantity of the second raw mix consumed for making the envelope was equal to the quantity of the first raw mix consumed for preparing the pellets. The resultant pellets about 10 mm in diameter were subjected to the heat treatment by the method described in Example 14.

The resultant clinker contained 0.6% by weight of $CaO_{free}$, 2.0% by weight of chlorine ion, 0.1% by weight of residual solid fuel carbon, and 78% by weight of highly basic calcium silicate. The ultimate compression strength of samples prepared from cement on the basis of this clinker was 560 kgf/cm² at the age of 28 days. The specific output of the grate was 0.68 tons/m²-h, the vertical sintering rate was 26.0 mm/min, the specific heat consumption was 585 kcal per 1 kg of clinker.

We claim:

1. A process for producing cement clinker comprising:
   dry grinding raw cement components to prepare a raw meal;
   mixing said raw meal with a solid fuel to prepare a batch mixture;
   pelletizing said batch with concurrent addition of calcium chloride thereto;
   heat treating the resultant pellets of raw mix while in a drying zone in a dense layer to dry the raw mix;
   subsequently roasting the layer of pellets while in a roasting zone by burning a solid fuel over the surface of said layer and maintaining the temperature of resultant gaseous combination products at a temperature between 1150° and 1250° C. for no longer than half of the period in which roasting is effected;
   while roasting said layer of pellets of raw mix drawing fuel combustion gaseous products through said dense layer of pellets and removing exhaust gaseous products released therefrom;
   lowering said temperature to between 900° in preparation for cooling said dense layer of pellets; and
   cooling said dense layer of pellets in a cooling zone to prepare a cement clinker.

2. A process according to claim 1, wherein said pellets of raw mix having the following composition in percentage by weight:
   clayey component: 20–22
   ferrugineous component: 2.0–3.0
   calcium chloride: 3.0–5.0
   solid fuel: 2.0–8.0
   limestone component: up to 100.

3. A process according to claim 1 wherein said exhaust gaseous products released from the dense layer while in said roasting zone are mixed with the raw meal in an amount of between 1 and 30% by weight of the raw meal mixed with the solid fuel and returned to the drying zone and drawn through the dense layer of pellets.

4. A process according to claim 1, wherein holes are formed in said dense layer within the middle of roasting zone to a depth of between 40 and 60% of the layer thickness, and wherein holes are formed to a depth of between 90% and 95% of the layer thickness at a distance of between 5% and 15% of the distance between the boundary of the roasting zone and the cooling zone, and the roasting zone and cooling zone being contiguous.

5. A process according to claim 1, wherein said dense layer consists of pellets of raw mix having different moisture content, said dense layer having on the side from which the removal of exhaust gases released therefrom takes place a thickness of between 30 to 100 mm. formed from pellets predried to a moisture content of a maximum of 3%.

6. A process according to claim 1, wherein the calcium added before pelltization to said batch of raw meal mixed with solid fuel is between 5% and 80% by weight of calcium chloride in the raw mix, and the remaining quantity of calcium chloride added is added during pelletization.

7. A process according to claim 1, wherein the dense layer of pellets on the side thereof at which exhaust gases are removed therefrom is of a thickness of between 10% and 30% of the total thickness of the layer and is made up of said pellets of raw mix containing from 3% to 5% by weight of calcium chloride.

8. A process according to claim 1, in which said dense layer of pellets has on the whole length thereof on a side on which removal of exhaust gases released therefrom takes place a thickness of from 10% to 30% of the total layer thickness formed from pellets of raw mix containing between 0.5% and 20% by weight of calcium chloride, the remainder of said layer being formed from pellets of a raw mix containing between 3% and 5% by weight of calcium chloride.

9. A process according to claim 1, wherein said pellets of raw mix are of spherical shape when subjected to the heat treatment and have a core made of a raw mix containing between 5% and 8% by weight of calcium chloride and an evenlope about said core made of raw mix containing between 1.0% and 2.0% by weight of calcium chloride.

10. A process according to claim 9, in which a ratio of the masses of the envelope and the core of said pellets is 0.3–3.0, respectively.

* * * * *